United States Patent
Melamed et al.

[11] 3,842,369
[45] Oct. 15, 1974

[54] DIAZO CHEMICAL TRANSFER LASER

[75] Inventors: Nathan T. Melamed; David C. Phillips, both of Pittsburgh, Pa.

[73] Assignee: Westinghouse Electric Corporation, Pittsburgh, Pa.

[22] Filed: July 20, 1973

[21] Appl. No.: 381,181

[52] U.S. Cl.................... 331/94.5, 330/4.3
[51] Int. Cl............................... H01s 3/22
[58] Field of Search............. 331/94.5; 330/4.3

[56] References Cited
UNITED STATES PATENTS
3,694,770  9/1972  Burwell et al................ 331/94.5
3,704,428  11/1972  Barry et al.................... 331/94.5

*Primary Examiner*—William L. Sikes
*Attorney, Agent, or Firm*—D. P. Cillo

[57] ABSTRACT

A chemical transfer laser, capable of producing stimulated laser emission, contains an optical resonant laser cavity containing a diazo—CO and/or diazo—$CO_2$ gas mixture, and means for supplying excitation energy to the dizao gas, to decompose the diazo gas to form vibrationally excited nitrogen gas molecules, which transfer energy to form an active laser medium comprising vibrationally excited CO and/or $CO_2$ molecules.

14 Claims, 3 Drawing Figures

DIAZO CHEMICAL TRANSFER LASER

BACKGROUND OF THE INVENTION

There is considerable interest in the development of molecular gas lasers capable of delivering high efficiency and high output powers in the infrared region. Of the gaseous lasers, both the $CO_2$ and CO molecular chemical lasers are of interest because their output wavelengths are about 10 and 5 microns respectively.

Most of the prior work and study has been done with regard to $CO_2$ lasers, which are the most important gas lasers in use today for high energy, high power applications. The preponderance of this work has been concerned with electric discharge operation, that is with the production of laser action by passing an electric discharge through the laser gas either in a continuous or pulsed manner. The importance of the CO laser is due to its low collisional de-excitation rates, permitting high power operation. The CO chemical laser also has the further potential advantage of being portable and independent of external power sources.

At the present time, the CO chemical lasers which have been developed suffer from low efficiencies, and from other difficulties. The CO electric discharge lasers must usually be operated at cryogenic temperatures. The most important prior art CO chemical laser emission is produced by an oxidation reaction between $CS_2$ and $O_2$. This CO chemical laser was disclosed by Pollock, APPLIED PHYSICS LETTERS, 8:238 (1966). The reaction occurs in several steps. The CS radical is initially created in the reaction:

$$CS_2 + O \rightarrow CS + SO$$

The central reaction in this laser is oxidation of the CS radical:

$$CS + O \rightarrow CO^* + S + 75 \text{ kcal/mole}$$

where $CO^*$ refers to a vibrationally excited molecule. The overall reaction may be written as:

$$CS_2 + 2\ 1/2 O_2 \rightarrow CO^* + 2SO_2$$

Several techniques have been used to create the atomic oxygen to initiate and maintain the reactions. The $CS_2$ laser has been excited using flash photolysis. Electrical discharges have also been used.

Although a $CO_2$ chemical laser can be made in principle by a chemical reaction in which vibrationally excited $CO_2^*$ molecules are produced directly, the most important $CO_2$ chemical lasers are those which derive their energy by transfer from a chemical of another species. The latter types are called chemical transfer lasers. The best example of these are the transfer of excitation energy from a deuterium fluoride chemical laser to $CO_2$ to form vibrationally excited $CO_2$ molecules. The reaction may be written as:

$$DF^* + CO_2 \rightarrow DF + CO_2^*$$

where the asterisk is used to designate the vibrationally excited state. Other examples pertinent to transfer lasers are the decomposition of liquid azides, such as hydrogen azide ($N_3H$), hydrazine azide ($N_5H_5$) and ammonium azide ($N_4H_4$), as taught by Burwell et al. in U.S. Pat. No. 3,694,770, to provide nitrogen transfer agent gas. The nitrogen transfer laser owes its success to the fact that there is a near coincidence between the metastable level of the excited $N_2^*$ molecules, and the metastable laser levels of $CO_2$ (001) and of CO (001)

i.e., $N_2 = 2,331$ cm$^{-1}$, $CO_2 = 2,349$ cm$^{-1}$ and $CO = 2,090$ cm$^{-1}$.

Nitrogen has other advantages as a transfer agent, in that the metastable-to-ground state transition in $N_2^*$ is strictly electric dipole forbidden, and all of the energy on the $N_2$ molecules transfers to $CO_2$ or CO with essentially no back transfer. Despite the clear advantages of $N_2^*$ as a transfer agent, chemical lasers based on metastable $N_2^*$ generation have not been very successful. One of the best known of these is the hydrogen azide ($N_3H$) to $CO_2$ laser. Its most serious disadvantages are low laser efficiency and the highly explosive nature of $N_3H$. $N_3H$ would decompose in the following manner:

$$2N_3H \rightarrow H_2 + 3N_2^*, \text{ and then energy transfer would follow:}$$

$$N_2^* + CO_2 \rightarrow CO_2^* + N_2.$$

The present invention is intended to overcome many of the difficulties of $N_2$ transfer lasers by means of a novel class of chemical decomposition reactions which produce laser gas and essentially no solid residues.

SUMMARY OF THE INVENTION

A CO or $CO_2$ chemical transfer laser, that is operable in pulsed, Q-switched and continuous wave mode, forms vibrationally excited CO or $CO_2$ molecules by means of the enclosed decomposition of diazo gas, such as diazomethane ($CH_2N_2$), cyclodiazomethane

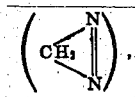

diazethane ($CH_3CHN_2$), and other diazo gas compounds having the general structural formula $R=N=N$, wherein R includes aliphatic diradicals, olefinic diradicals and cyclo-olefinic diradicals, which will decompose to form excited $N_2^*$ molecules that can transfer their energy to either $CO_2$ or CO laser gas, by molecular collision within an optical resonant cavity.

DESCRIPTION OF THE DRAWING

For a better understanding of the invention, reference may be made to the preferred embodiment, exemplary of the invention shown in the accompanying drawings in which.

DESCRIPTION OF THE PREFERRED EMBODIMENTS

Figure 1:
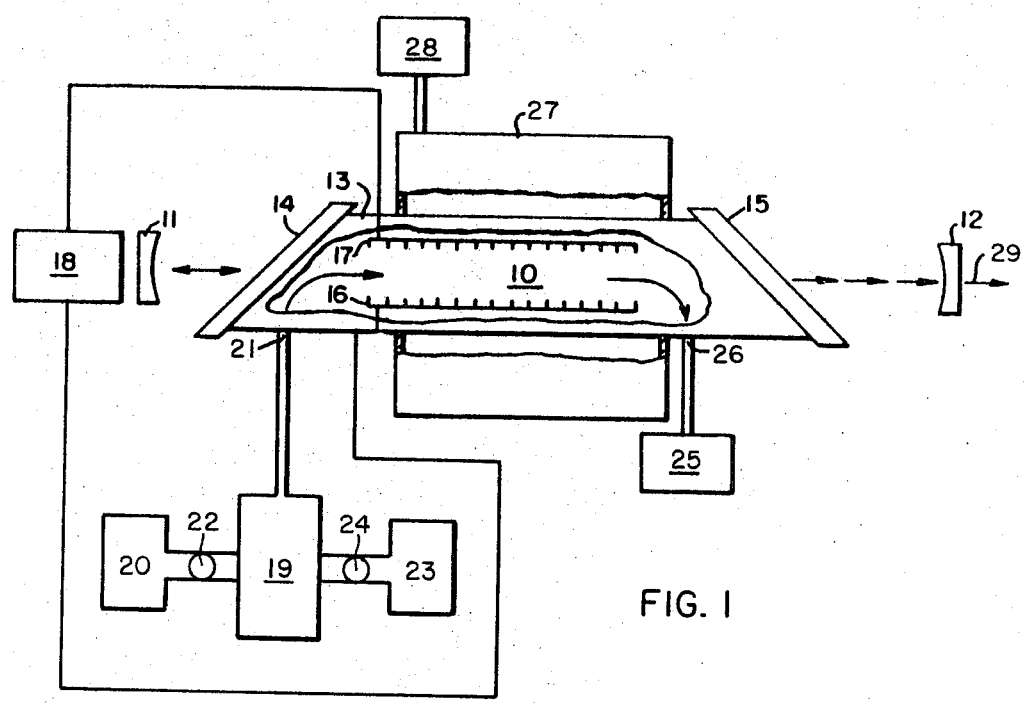
FIG. 1 shows one embodiment of the laser of this invention, having a single lasing chamber and operating in the continuous wave mode.

The present invention provides a CO and/or $CO_2$ chemical transfer laser by means of the decomposition of a diazo compound i.e., of the general formula $R=N^-=N^+$. Diazo compounds suitable in this invention to provide nitrogen transfer agents must be volatile at laser operating temperatures and include diazomethane ($CH_2N_2$ i.e., $CH_2=N=N$), cyclodiazomethane or diazarine

diazoethane ($CH_3CHN_2$), and other volatile diazo compounds having the general formula $RN_2$, wherein R can be aliphatic diradicals having from about 1 to 5 carbon atoms (such as $CH_2$, $C_2H_4$, $C_3H_6$, $C_4H_8$ and $C_5H_{10}$), olefinic diradicals having from about 2 to 5 carbon atoms (such as $CH_2=C$), and cyclo-olefinic diradicals having from about 3 to 5 carbon atoms (such as

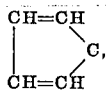

which forms diazocyclopentadiene).

Diazomethane (azimethylene) is typical of the useful diazo gaseous compounds and is preferred in this invention. While diazomethane is highly exothermic due to the nature of its photolytic decomposition, it is a moderately stable compound at room temperature. Other properties are that it is a yellow gas with a boiling point of $-23°$ C, and a melting point of $-145°$ C, it can be readily prepared from sodium, nitrosomethylurethane, and nitrogen starting materials, and it can be readily stored as a liquid at dry ice temperatures.

Diazomethane has an absorption band from about 4,700 to 3,200 A and a much more intense band starting at about 2,700 A. The photolytic decomposition reaction proceeds in two steps. For each photon absorbed two $N_2$ molecules are produced in the following manner:

$$CH_2N_2{}^{h\nu} \rightarrow CH_2: + N_2*$$
$$CH_2: + CH_2N_2 \rightarrow C_2H_4 + N_2*$$

where $CH_2$ : refers to the methylene diradical, $N_2*$ refers to a vibrationally excited transfer gas molecule and $C_2H_4$ is the reaction product gas.

The reaction is highly exothermic and there is little doubt that some of the energy released will go to form mestastable $N_2$ ions. Under photochemical conditions, there is no evidence of explosions occurring during decomposition. However, heating above $200°$ C may result in explosive mixtures. It is likely that chain reactions can be obtained below $200°$ C in a controlled fashion. The reaction proceeds very rapidly in times of the order of a millisecond or less. Measurements of the quantum yield for decomposition indicate it to be approximately four with both 4,360 and 3,650 A light. Under the proper conditions it is unlikely that any solid foulant reaction products are formed.

The decomposition of diazomethane is very exothermic. The energy released is approximately 100 kcal mole$^{-1}$ of diazomethane. A considerable effort has gone into determining the fraction of this energy which appears on the methylene diradical. This number is quite uncertain, but it seems that a certain fraction of the released energy will go to produce excited $N_2*$ molecules.

Cyclodiazomethane or diazarine absorbs in the region from about 3,000 to 3,700 A and $N_2*$ molecules are produced in the following manner:

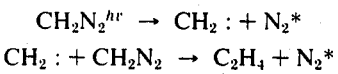

Diazoethane absorbs in the region from about 3,500 to 5,000 A and $N_2*$ molecules are thought to be produced in the following manner:

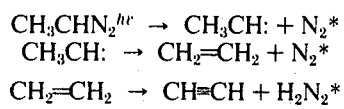
$$CH_3CH: \rightarrow CH_2=CH_2 + N_2*$$
$$CH_2=CH_2 \rightarrow CH\equiv CH + H_2N_2*$$

where all the products are simple gaseous molecules.

The principal use of the diazo compounds in this invention is a source of vibrationally excited $N_2*$ molecules. Because of the electric dipole forbidden character of the vibrational transitions in $N_2$, excited $N_2*$ molecules decay very slowly by internal transitions. Therefore $N_2$ molecules can store energy for relatively long periods of time and can transfer this energy efficiently to other molecules having resonant transitions.

Once vibrationally excited $N_2*$ molecules are formed they can transfer their energy to either $CO_2$ gas to make a $CO_2$ chemical laser, to CO gas to make a CO chemical laser or to a mixture of CO and $CO_2$ to make a combination laser. In the case of a $CO_2$ laser, $CO_2$ molecules are excited from the ground vibrational energy level (000) to an upper vibrational energy level (001) by collision with vibrationally excited $N_2*$ and then stimulated to emit electromagnetic radiation. The emission causes the $CO_2$ to assume an intermediate vibrational energy level (100) for a period of time before returning to the ground level (000), passing through a non-laser emitting level (010) in the process. The 010 level has a relatively long decay time and excessive buildup in the population of this level can destroy the 001 inversion. Gases that help depopulate the 010 level by relaxing them are He, $H_2$ and water vapor. These relaxant gases are therefore useful as additives to $CO_2$ lasers.

The $CO_2$ molecule is preferentially pumped by collision with $N_2*$ due to a naturally occurring match of energy levels between these two gases, i.e., $N_2 = 2,331$ cm$^{-1}$ and $CO_2 = 2,349$ cm$^{-1}$. In addition to the matched energy level characteristic, $N_2*$ has a relatively long lifetime in the first vibrational level (V=1) and after mixing and collision with $CO_2$ molecules and energy transfer the $N_2$ reverts to the ground state (V=0) while the $CO_2*$ assumes a lasable state for a relatively short lifetime. For both $CO_2$ and CO, the reactions can be written as:

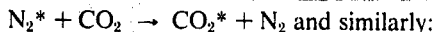
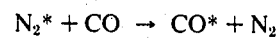

where CO* and $CO_2*$ refer to vibrationally excited laser gas molecules.

Neither the presence of CO nor $CO_2$ interferes with the decomposition reaction of $CH_2N_2$ or other diazo compounds. The $CH_2N_2$ or other diazo compounds must be mixed with CO or $CO_2$ laser gas in controlled quantities so that the lasing gas composition is one of proper $N_2*$ and CO or $CO_2$ proportions, to produce the maximum power laser output beam. The useful volume ratio of $N_2*$:CO molecules is from about 7 to 1:1 and the useful volume ratio of $N_2*$:$CO_2$ molecules is from about 8 to 1:1. Sufficient diazo compound must be introduced into the laser system to be effective to provide enough $N_2*$ after mixing and decomposition.

The decomposition of diazo compounds for laser applications may be performed in pure diazo—CO and/or diazo—$CO_2$ gas system but is preferably performed in a mixture containing other selected gases. The diazo must be present in the laser system of this invention in an amount effective to provide gain. This means that during diazo decomposition and energy transfer by $N_2*$ a sufficient amount of active CO* or $CO_2$* must be created so that the optical gain due to the CO* or $CO_2$* molecules at the desired wavelength is at least sufficient to overcome the losses in the laser. The amount of diazo gas that is required therefore, depends on the way in which the laser is operated, the amount of loss present, and on the presence of other gases. Theoretically, this amount may be as low as a dozen molecules within a suitable gas mixture. In a pure diazo—CO or diazo—$CO_2$ gas system, the diazo compound would constitute from about 50 to about 90 volume percent of the gas mixture. Some buffer gases may be included in the gas system in order to reduce possible collisional deexcitation of either CO* or $CO_2$* and to lower the temperature of superexcited CO* or $CO_2$* molecules.

The buffer gas does not directly participate in the laser action, but serves as a diluent gas. One of its functions is to reduce the likelihood of undesirable collisions. An ideal buffer gas is one which can collide with a CO* or $CO_2$* molecule without deexciting it or changing its vibrational state of excitation. The use of buffer gases is well known in the art of chemical and gas lasers. Suitable buffer gases are such gases as $SF_6$, He, Ne, Ar, Kr and Xe, alone or in mixtures. He is also a relaxant gas for $CO_2$.

A preferred amount of buffer gas would be about 20 to about 100 Torr in mixture with about 20 to about 100 Torr of diazo gas and about 20 to about 100 Torr CO. In a $CO_2$ system, buffer gas can be used at from about 0 to about 10 Torr in mixture with about 20 to about 100 Torr of diazo gas, about 20 to about 100 Torr $CO_2$ and about 20 to about 100 Torr relaxant gas such as He, $H_2$ and water vapor ($H_2O$). Desirable other gases in a CO system are $O_2$ in amounts up to about 4 Torr but preferably between about 0.5 to about 1 Torr. The $O_2$ active electronegative gas improves the lasing action of the CO system. $O_2$ is useful, within the above ranges, in the CO system, as a scavenger gas for the methylene diradical. The use of $O_2$ over about 4 Torr may cause loss of efficiency in the CO system.

Gases which are effective in causing collisional deexcitation of CO* or $CO_2$* vibrational levels are generally not suitable as buffer gases. Examples of such undesirable gases are sulfur dioxide, high molecular weight organic gases such as, for example, propane and butane, $O_2$ in a $CO_2$ system and $O_2$ over about 4 Torr in a CO system. Water vapor is also undesirable for CO systems.

The decomposition of the diazo compounds in a laser generator may be initiated in various ways, such as: photolytic — by the absorption of photons of the appropriate frequency from a light source such as Mercury, Xenon or other suitable flashlamp which provides pump energy; electrical — by an electric discharge or spark; nuclear — by neutrons or fission fragments or both and thermal — by heating either locally or raising the overall temperature.

Generally, cooling laser gas to low temperatures improves laser performance. This is based on the fact that as the gas temperature increases, the rate of energy loss from excited vibrational states by way of collisions with species other than $N_2$* increases. Preferably, temperatures within the range of about 150° to 475° K should be used for the CO or 210° to 475° K for the $CO_2$ lasers of this invention, along with partial pressure of diazo gas within the range of about 0.1 Torr to 760 Torr.

In comparing the diazo reactions of this invention with those involving azides it is important to note that the explosion temperature limit of the diazo compounds is quite high and chain reactions can be obtained up to about 475° K in a controlled fashion whereas azides are highly explosive. In the diazo system, by operating close to, but under, the explosion limit a minimum of triggering energy would be required to initiate a reaction. The diazo compounds are also more storageable fuels.

Either pulsed or continuous wave operation is possible in this invention by continuous photolysis electric discharge or other means of reaction initiation. Q-switching may be accomplished by one of several means, such as rotating one of the resonator mirrors. Bleachable filters or electro-optic Q-switches may be used for Q-switching with suitable materials that are known and available. Single frequency operation may be obtained by the use of a suitable grating within the laser cavity. Single frequency operation may also be used in conjunction with Q-switching if desired.

Figure 2:
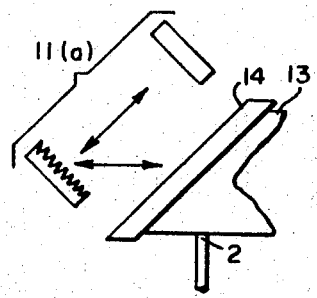
FIG. 2 shows the laser of this invention utilizing a grating-mirror combination.
Figure 3:
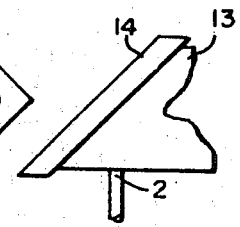
FIG. 3 shows the laser of this invention utilizing a Q-switching means.

Referring now to FIG. 1, a simple schematic illustration of one embodiment of a gas mixing chemical laser generator is shown. The components of physical hardware used in fabricating the structural embodiments of the invention are well known in the laser art and described in U.S. Pat. No. 3,704,428, herein incorporated by reference. An optical cavity 10 is formed between opposite fixed highly reflective concave mirror 11 and opposite parallel fixed partially reflecting concave transmission mirror 12. Reflective means 11 should be about 99 percent reflective while reflective means 12 should be about 50 percent reflective, although this percentage depends upon the geometry of the cavity, the gain of the gas medium and the conditions of use. In other embodiments of the invention the fixed concave mirror 11 can be substituted for by a movable diffraction grating, such as a Littrow replica grating, with for example, about 100 lines per mm. and blazed at about 15° for 5.18 microns, or by a diffraction grating-mirror combination 11(a), shown in FIG. 2, to provide continuous wave single-line operation; or a conventional Q-switch mirror or other suitable Q-switch means 11(b), shown in FIG. 3, to provide pulsed operation. The Q-switch 11(b) can be, for example a rotating cubic mirror having one surface coated so as to be effectively 100 percent reflective. The Q-switch is positioned and aligned so that this reflective surface forms one of the optical cavity mirrors.

The glass cylinder 13, in FIG. 1, such as a double-walled Pyrex discharge tube, which is sealed at each end by conventional $CaF_2$, NaCl, or other suitable type Brewster angle windows 14 and 15, is positioned within the optical cavity 10, and contains the diazo gas-laser gas mixture used in this invention along with effective amounts of electro-negative gas, inert buffer gas, gases or, in the case of $CO_2$, relaxant gas. Excitation electrodes 16 and 17 made of thin wires, plates or similar elements are shown connected to power supply 18, which can provide an intermittent electric potential between the electrodes of, for example, about 5 pulses/-second having a duration of about 5 to 10 microseconds and an electric potential range of about 1 to 25 kilovolts. The pulsed electric discharge across the diazo—CO or diazo—$CO_2$ gas mixture causes breakdown of the diazo gas to various radicals and reaction products and vibrationally excited $N_2$* transfer gas within the tube 13. Other means for supplying excitation to initiate decomposition of the diazo compounds, to form a $N_2^*$ transfer agent gas and an active laser medium from the mixture of diazo and CO or $CO_2$ gas, can be substituted for the electrical initiation means, for example photolytic, nuclear or thermal excitation means.

The gas mixture 19, contains effective amounts to about 760 Torr of a diazo gas from a suitable source 20 connected to inlet 21 through connecting pipes and pump 22, and CO and/or $CO_2$ gas from a suitable source 23 connected to inlet 21 through connecting pipes and pump 24. Preferably, effective amounts of the diazo gas and either CO or $CO_2$ gas are mixed before the diazo gas is decomposed in the tube 13 between electrodes 16 and 17. An aerodynamic nozzle may be used in the inlet 21 to help in the mixing. The diazo-CO or $CO_2$ gases may be stored as a high pressure gas in which case there would be no need for the pumps. The diazo-CO or $CO_2$ gases can be optionally cooled, For the diazo-$CO_2$ system, large effective amounts of relaxant gas, such as He, $H_2$, and water vapor, and for the diazo—CO system, up to about 4 Torr of electronegative gas, such as $O_2$ and large effective amounts of $SF_6$, He, Ne, Ar, Kr, Xe or other suitable inert buffer gas is also introduced into the laser cavity, through the inlet 21, from a suitable source and flows axially through the cylinder 13 within the laser cavity 10 and between the reflective means.

Preferably either CO or $CO_2$ is used separately as laser gas. A preferred mixture would contain about 20 to about 100 Torr of the diazomethane gas, about 20 to about 100 Torr of the CO, about 0.5 to about 1 Torr $O_2$ active electronegative gas and about 20 to about 100 Torr $SF_6$ gas. A preferred mixture for a $CO_2$ system would contain about 20 to about 100 Torr of the diazomethane gas, about 20 to about 100 Torr of the $CO_2$ gas, and about 20 to about 100 Torr He gas. It is also possible to use a combination CO—$CO_2$ system when He is used as a buffer-relaxant gas, it being compatible with both CO and $CO_2$. In such a system the preferred mixture would contain about 20 to about 100 Torr diazomethane, about 20 to about 100 Torr He, and about 20 to about 100 Torr of a mixture of Co and $CO_2$.

The diazo gas must be metered in such quantities as are effective to provide enough $N_2^*$ after decomposition to optimumly excite the CO or $CO_2$ molecules. A vacuum exhaust pump 25 is connected to the discharge tube at outlet 26 through a suitable vacuum control valve. The gas pumping rate for the gas mixture can be for example about 35 liters/min. for a discharge tube of about one meter in length with about a 40 mm. bore.

Cooling means 27 can be used in this type laser apparatus, where for example a supply of coolant, such as for example Freon-dry ice or cold water, at 28 is used to provide operating temperatures in the resonant laser cavity between about 150° K for CO, or 210° K for $CO_2$ or $CO_2$—CO, to about 475° K. A portion of the exhaust CO or $CO_2$ gas may be recycled by any suitable means and cooled and mixed with the gases introduced through the inlet.

Output laser beam 29 results from adjusting the mirrors of the optical laser cavity to produce stimulated emission and an output beam which is laser energy having a wavelength between about 4.7 and 5.9 microns when CO is used and between about 9.6 and 10.6 microns when $CO_2$ is used in the gas mixture.

We claim:

1. A chemical transfer laser capable of producing stimulated laser emission, comprising:
   a. an optical resonant laser cavity;
   b. a laser gas selected from the group consisting of CO and $CO_2$ and mixtures thereof;
   c. diazo gas;
   d. means for mixing the laser gas with the diazo gas to form a gas mixture;
   e. means for introducing said gas mixture into the resonant laser cavity; and
   f. means for supplying excitation energy to the diazo gas of the gas mixture, to form an active laser medium comprising vibrationally excited laser gas by means of energy transfer by vibrationally excited nitrogen gas molecules formed by decomposition of the diazo gas.

2. The chemical transfer laser of claim 1 wherein the gas introduced into the laser cavity also includes at least one other gas, acting as an inert buffer gas, selected from the group consisting of $SF_6$, He, Ne, Ar, Kr, and Xe when CO is the laser gas, and at least one other gas, acting as a relaxant gas, selected from the group consisting of He, $H_2$, and $H_2O$ when $CO_2$ is the laser gas.

3. The chemical transfer laser of claim 1 wherein the ratio of vibrationally excited nitrogen gas: CO, when CO is the laser gas is from about 7 to 1:1 and wherein the ratio of vibrationally excited nitrogen gas: $CO_2$, when $CO_2$ is the laser gas is from about 8 to 1:1.

4. The chemical transfer laser of claim 1 containing means for exhausting the gases from the laser cavity wherein the partial pressure of diazo gas within the laser cavity is between about 0.1 to about 760 Torr and wherein the temperature in the laser cavity is between about 150° K and 475° K when CO is the laser gas and between about 210° K and 475° K when $CO_2$ is the laser gas.

5. The chemical transfer laser of claim 1 containing Q-switching means.

6. The chemical transfer laser of claim 2 wherein the gases introduced into the laser cavity also includes $O_2$ up to about 4 Torr where CO is the laser gas.

7. The chemical transfer laser of claim 2 wherein the laser cavity is formed between reflective means, the excitation energy is supplied to the diazo gas by an electrical discharge across the gas mixture, and the gas mixture flows axially through the laser cavity and between the reflective means.

8. The chemical transfer laser of claim 2 wherein the diazo gas has the structural formula $RN_2$, wherein R is selected from the group consisting of aliphatic diradicals having about 1 to 5 carbon atoms, olefinic diradicals having about 2 to 5 carbon atoms and cyclo-olefinic diradicals having about 3 to 5 carbon atoms.

9. The chemical transfer laser of claim 2 wherein the diazo gas is selected from the group consisting of diazomethane, cyclodiazomethane, and diazoethane.

10. The chemical transfer laser of claim 2 wherein the diazo gas comprises from about 20 to about 100 Torr, He comprises about 20 to about 100 Torr and a CO—$CO_2$ gas mixture comprises about 20 to about 100 Torr of the gas mixture.

11. The chemical transfer laser of claim 2 wherein the diazo gas comprises from about 20 to about 100

Torr, relaxant gas comprises from about 20 to about 100 Torr and $CO_2$ comprises about 20 to 100 Torr of the gas mixture.

12. The chemical transfer laser of claim 6 wherein diazo gas comprises from about 20 to about 100 Torr, CO gas comprises from about 20 to about 100 Torr, buffer gas comprises from about 20 to about 100 Torr and $O_2$ comprises from about 0.5 to 1 Torr of the gas mixture.

13. A chemical transfer laser capable of producing stimulated laser emission comprising:

a. an optical resonant laser cavity containing a gas mixture comprising a diazo gas and a laser gas selected from the group consisting of CO and $CO_2$; and b. means for supplying excitation energy to the diazo gas to decompose the diazo gas to form vibrationally excited nitrogen gas molecules which transfer energy to the laser gas to form an active laser medium comprising vibrationally excited laser gas.

14. The chemical transfer laser of claim 13 wherein the diazo gas is diazomethane.

* * * * *